(12) United States Patent
Yamada et al.

(10) Patent No.: US 6,176,216 B1
(45) Date of Patent: Jan. 23, 2001

(54) IGNITION CONTROL FOR FUEL DIRECT INJECTION TYPE ENGINE

(75) Inventors: Kazuhiro Yamada, Chiryu; Yasuo Ito, Nagoya; Kazuhisa Mogi, Susono, all of (JP)

(73) Assignees: Denso Corporation, Kariya; Toyota Jidosha Kabushiki Kaisha, Toyota, both of (JP)

( * ) Notice: Under 35 U.S.C. 154(b), the term of this patent shall be extended for 0 days.

(21) Appl. No.: 09/151,396

(22) Filed: Sep. 11, 1998

(30) Foreign Application Priority Data

Sep. 11, 1997 (JP) .................................................. 9-246276
Aug. 21, 1998 (JP) ................................................ 10-235591

(51) Int. Cl.$^7$ ............................................................ F02B 17/00
(52) U.S. Cl. ........................... 123/295; 123/305; 123/607
(58) Field of Search ................................... 123/295, 305, 123/636, 637, 606, 607, 649

(56) References Cited

U.S. PATENT DOCUMENTS

| 3,945,365 | * | 3/1976 | Reguiero | ............................. | 123/260 |
| 4,138,977 | * | 2/1979 | Grather et al. | ....................... | 123/637 |
| 4,162,665 |   | 7/1979 | Gräther et al. . | | |
| 4,349,008 | * | 9/1982 | Wainwright | ........................... | 123/606 |
| 4,561,406 | * | 12/1985 | Ward | ..................................... | 13/606 |
| 4,677,960 | * | 7/1987 | Ward | ..................................... | 123/637 |
| 4,774,914 | * | 10/1988 | Ward | ..................................... | 123/636 |
| 4,886,036 | * | 12/1989 | Johansson et al. | .................. | 123/649 |
| 5,111,798 | * | 5/1992 | Notaras et al. | ....................... | 123/637 |
| 5,170,760 | * | 12/1992 | Yamada et al. | ....................... | 123/295 |
| 5,211,147 | * | 5/1993 | Ward | ..................................... | 123/637 |
| 5,476,084 | * | 12/1995 | Morganti et al. | .................... | 123/637 |
| 5,638,799 | * | 6/1997 | Kiess et al. | ............................ | 123/637 |
| 6,032,657 | * | 3/2000 | Rossi et al. | ............................ | 123/637 |
| 6,035,824 | * | 3/2000 | Lee | ..................................... | 123/636 |

FOREIGN PATENT DOCUMENTS

| 56-126671 | 10/1981 | (JP) . |
| 58-140475 | 8/1983 | (JP) . |
| 62-85179 | 4/1987 | (JP) . |
| 62-129575 | 6/1987 | (JP) . |
| 63-138122 | 6/1988 | (JP) . |
| 2-74573 | 6/1990 | (JP) . |
| 4-179859 | 6/1992 | (JP) . |
| 10-2224 | 1/1998 | (JP) . |

* cited by examiner

Primary Examiner—Erick Solis
(74) Attorney, Agent, or Firm—Nixon & Vanderhye P.C.

(57) ABSTRACT

In a direct fuel injection engine, an ignition coil generates a high voltage applied to a spark plug at a desired ignition time and a similar ignition voltage is then continued to be repeatedly generated at a fixed frequency so that the spark plug generates multiple sparks in each ignition cycle. The number of sparks included in the multiple is reduced as an engine speed rises. The multiple spark generating operation is disabled when the engine is in a high speed and/or high load region of operation.

15 Claims, 6 Drawing Sheets

IGNITION CONTROL FOR FUEL DIRECT INJECTION TYPE ENGINE

CROSS REFERENCE TO RELATED APPLICATION

This application relates to and incorporates herein by reference Japanese Patent Applications No. 9-246276 filed on Sep. 11, 1997 and No. 10-235591 filed on Aug. 21, 1998.

BACKGROUND OF THE INVENTION

1. Field of the Invention

The present invention relates to an ignition control for a direct fuel injection type internal combustion engine in which gasoline fuel is injected directly into a combustion chamber.

2. Related Art

In a direct fuel injection type internal combustion engine, air-fuel mixture of a very lean air-fuel ratio is burned in combustion chambers for low fuel consumption and low exhaust emission. This lean air-fuel mixture is less ignitable in comparison with an air-fuel mixture of stoichiometric air-fuel ratio by which conventional engines are operated. Therefore, the direct fuel injection type engine is designed to have an improved fuel injection system and improved piston configuration so that fuel-rich region in a generally stratified lean air-fuel mixture is formed near a spark generating area of a spark plug for better ignitability. For instance, as shown in FIG. 8, the fuel-rich mixture formed by air and fuel injected directly from a fuel injector 18 into the combustion chamber is guided toward the spark generating area of a spark plug 17 along a top recess 21 of a piston 20, i.e., from T1 to T3 through T2 in the combustion chamber. The spark plug 17 is activated to generate an electric discharge spark and ignite the fuel-rich mixture first when the fuel-rich mixture arrives at T3. The combustion of the fuel-rich mixture propagates to the fuel-lean mixture existing around the fuel-rich mixture.

However, timing of fuel injection, timing of opening and closing of an intake valve, flow speed of the fuel-rich mixture in the combustion chamber and the like vary from time to time and from engine to engine. Thus, as shown in FIG. 9, time of arrival of the fuel-rich mixture at the spark generating area of the spark plug 17 varies between time t1 and time t2. If the arrival time is later than the time the spark plug 17 generates the electric discharge spark, the fuel-rich mixture will not be ignited resulting in misfire of the stratified air-fuel mixture in the engine. The electric discharge period of the spark plug 17 may be lengthened to ignite even the late-arriving fuel-rich mixture. This will, however, increase the size and weight of the ignition device.

SUMMARY OF THE INVENTION

It is therefore an object of the present invention to provide an improved ignition control which ensures igniting a stratified air-fuel mixture in a fuel direct injection type internal combustion engine.

According to the present invention, a switching device for an ignition coil is turned on and off repeatedly so that the ignition coil repeats its electric discharging a multiple of times for generating multiple sparks from a spark plug in each ignition cycle of an internal combustion engine. These multiple sparks ignite a fuel-rich mixture in a generally lean stratified air-fuel mixture even in the case that a arrival of fuel-rich mixture at the spark generating area of the spark plug is delayed after the first spark.

The multiple sparks may disadvantageously promote wear of an electrodes of the sparkplug and heating of an ignition device. Therefore, multiple discharging is preferably limited to a necessary minimum. That is, multiple discharging is limited to only a predetermined engine operating region where the arrival timing of the fuel-rich mixture is likely to vary. The multiple discharging is disabled in the other engine operating regions where the arrival time of the fuel-rich mixture does not vary so much.

Specifically, the multiple discharging may be limited to only a relatively low engine speed region. In a high engine speed region, the period of ignition cycle is short and the variation in arrival time of the fuel-rich mixture is small. Therefore, the fuel-rich mixture is ignited by a single spark in the high engine speed region. Because the ignition device operates more frequently in the high engine speed region, the ignition device will generate more heat than in the low engine speed region. Disabling the multiple discharging will restrict excessive heating of the ignition device as well as excessive wear of the plug electrodes. Alternatively, the number of multiple discharges may be reduced as engine rotational speed increases.

In case the relatively lean air-fuel mixture is switched to a richer air-fuel mixture (e.g., stoichiometric air fuel ratio mixture) when the engine operation region changes from a low engine load region to a high engine load region, the combustion chamber is filled with relatively rich non-stratified air-fuel mixture uniformly. In this high engine load region, the variation in the arrival time of the air-fuel mixture at the spark generating area does not affect ignition performance so much. Therefore, multiple discharging also may be limited to only a low engine load region.

The multiple discharging also may be limited to a fixed angular rotation interval of an engine crankshaft. This will in effect also reduce the number of multiple discharges in response to an increase in engine rotational speed, because the time period required for the engine crankshaft rotate through the fixed angular interval reduces as engine rotational speed increases.

The switching device should be turned on while the ignition coil still has stored energy, after it has been turned off first at an ignition timing, so that the ignition coil can store sufficient energy for the subsequent discharging by only a short turning on of the switching device.

BRIEF DESCRIPTION OF THE DRAWINGS

Other objects, features and advantages of the present invention will become more apparent from the following description made with reference to the accompanying drawings.

DETAILED DESCRIPTION OF THE PREFERRED EMBODIMENT

Figure 1:
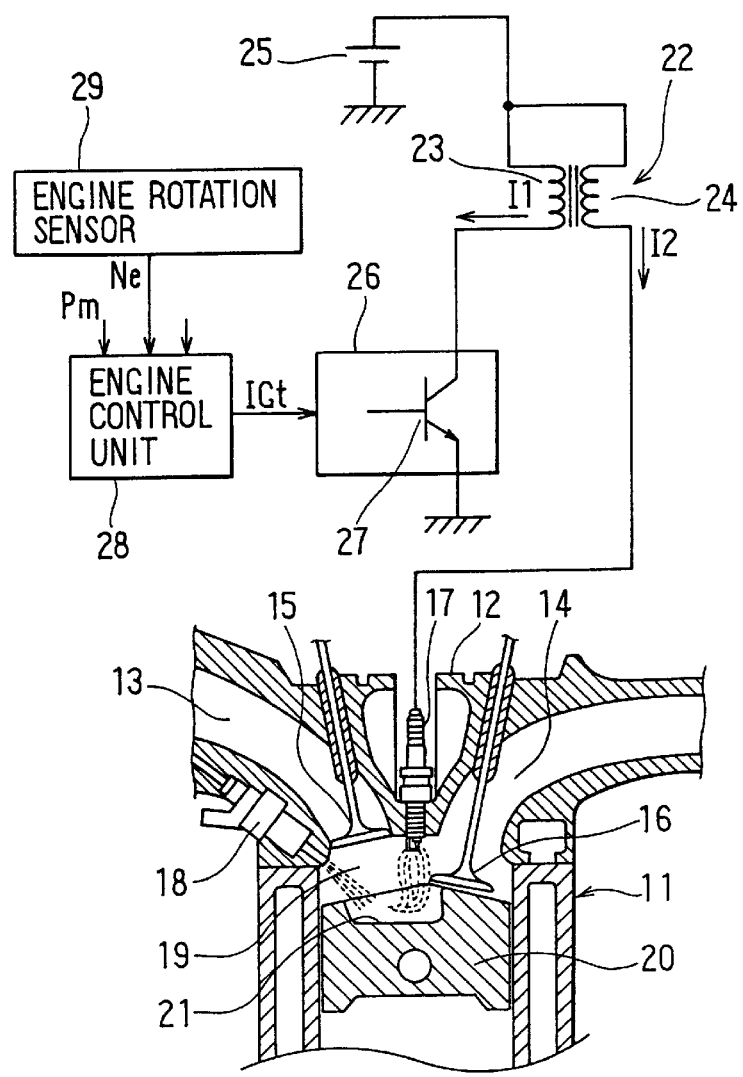
FIG. 1 is a schematic view showing an ignition system for a direct injection type internal combustion engine according to a first embodiment of the present invention.

Referring first to FIG. 1 showing a first embodiment, a direct injection type engine 11 has a cylinder head 12 which is formed with an intake port 13 and an exhaust port 14. An intake valve 15 and an exhaust valve 16 are disposed in the intake port 13 and the exhaust port 14, respectively. An ignition spark plug 17 is mounted on the cylinder head 12 at a position intermediate between the intake port 13 and the exhaust port 14, so that its spark generating area is located in a combustion chamber 19. A high-pressure swirl-generating type fuel injector 18 is mounted at a lower side of the intake port 13 to inject gasoline fuel directly into the combustion chamber 19. Specifically, the fuel injector 18 is directed toward the top surface of a piston 20. The piston 20 has a recess 21 on its top to guide the flow of fuel injected from the fuel injector 18 along its topmost surface to the spark plug 17. Thus, fuel-rich mixture is formed around the spark plug 17 and fuel-lean mixture fills the other space in the combustion chamber 19, providing a stratified air-fuel mixture in the combustion chamber 19.

Figure 2:
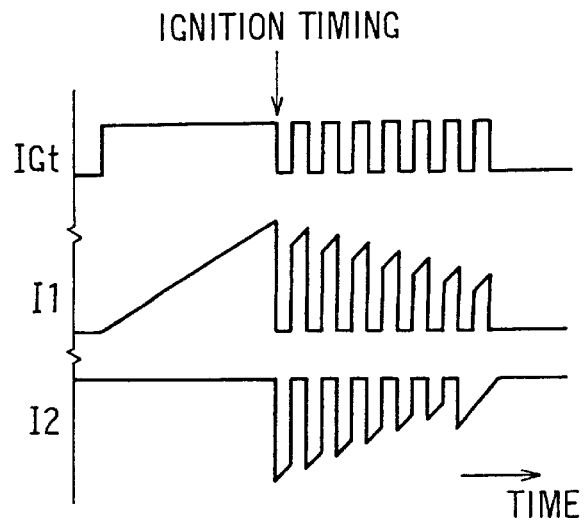
FIG. 2 is a time chart showing an operation of an ignition device in the first embodiment.

The spark plug 17 has a central electrode which is connected to a secondary winding 24 of an ignition coil 22. A primary winding 23 of the ignition coil 22 is connected to a battery 25 at its one end and to a power transistor (switching device) 27 of an igniter circuit 26. During engine operation, the power transistor 27 turns on and off in response to the rise and fall of an ignition signal IGt, respectively, which an engine control unit 28 generates. As shown in FIG. 2, a primary current I1 flows in the primary winding 23 from the battery 25 when the power transistor 27 turns on. Thereafter, the primary current I1 is interrupted when the power transistor 27 turns off. That is, the ignition coil 24 discharges so that the secondary winding 24 generates the high voltage (secondary current I2) therein. The spark plug 17 generates an ignition spark in response to the high voltage.

The engine control unit 28 includes a microcomputer which calculates ignition timing as well as fuel injection amount and injection timing based on engine operating parameters such as an intake air pressure Pm, engine rotational speed Ne, coolant temperature and the like detected by respective sensors (not shown). Specifically, the engine rotational speed Ne may be detected from a pulse signal generated by an engine rotation sensor 29 at every fixed angular rotation of an engine crankshaft. The engine control unit 28 has a ROM (read-only memory) which stores therein a multiple discharge control program. The microcomputer in the engine control unit 28 executes this program for turning on and off the power transistor 27 repeatedly at a fixed frequency after the interruption of the primary current I1 (turning off of the power transistor 27) at the ignition timing, so that the spark plug 17 generates a multiple of ignition sparks in each ignition cycle.

Figure 3:
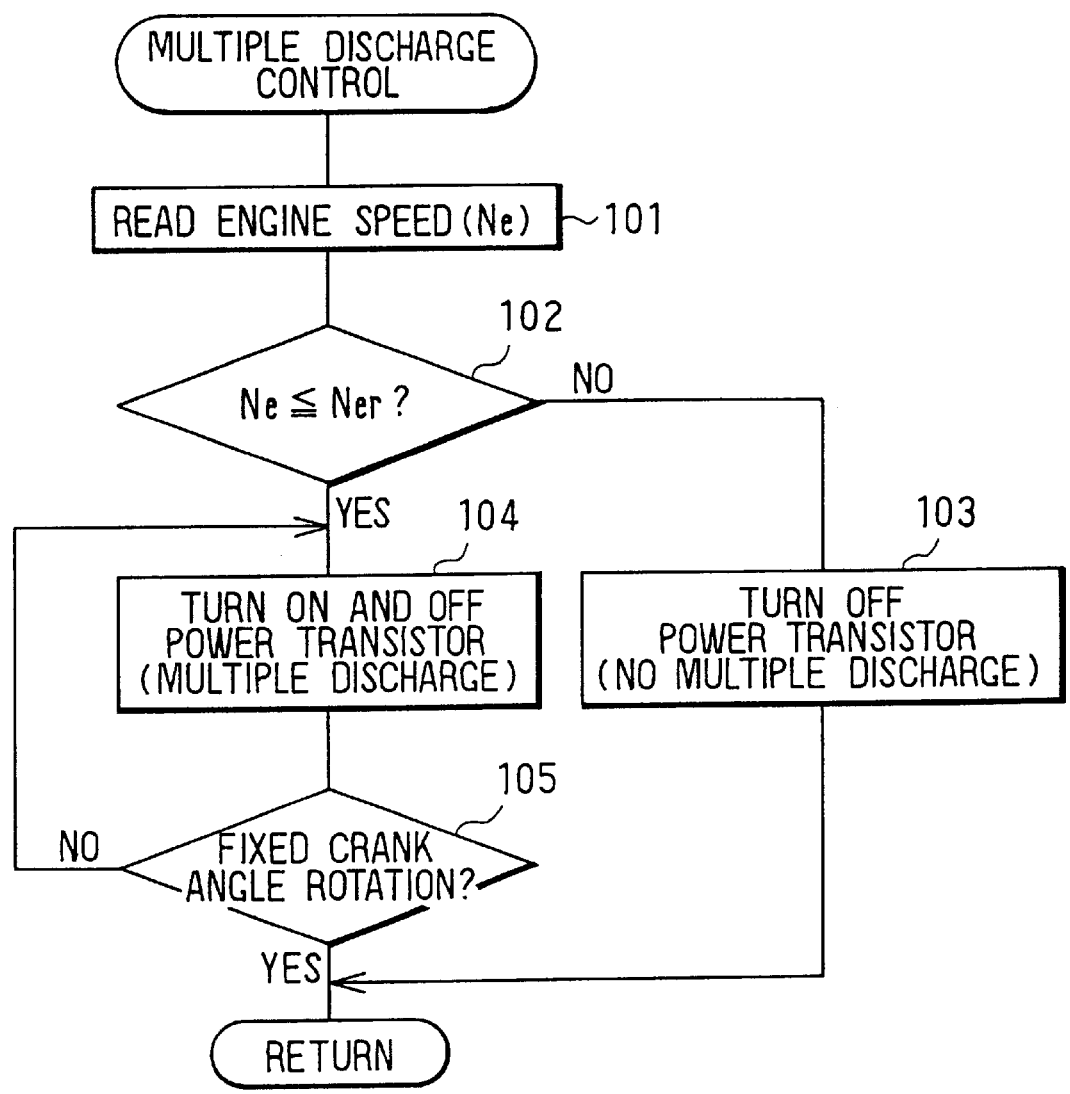
FIG. 3 is a flow chart showing a processing of multiple discharge control in the first embodiment.

This control program is executed in each ignition cycle as shown in FIG. 3. The microcomputer first reads the engine rotational speed Ne at step 101, and checks at step 102 whether the speed Ne is lower than a reference speed Ner, i.e., whether the engine condition is in a low or medium speed region where the multiple discharging should be attained.

If NO, the microcomputer maintains the off-condition of the power transistor 27 at step 103 after the first turning off from the on-condition at the ignition timing, thereby disabling the multiple discharging. If YES, however, the microcomputer repeats at step 104 turning on and off the power transistor 27 at a fixed frequency after the first turning off from the on-condition at the ignition timing, thereby attaining the multiple discharging. That is, as shown in FIG. 2, the microcomputer generates the ignition signal IGt having a repetition of a high frequency pulses so that the primary current I1 and the secondary current I2 changes responsively. The microcomputer then checks at step 105 whether the engine crankshaft has rotated a fixed crank angular interval. For this checking, the microcomputer may count the number of rotation pulses generated by the engine rotation sensor 29. If YES, the microcomputer stops on/off operation of the power transistor 27, thereby stopping the multiple discharging.

It is to be noted in the above control that the power transistor is turned on again while the ignition coil 22 still stores the electric energy therein after the first turning off at the ignition timing. Thus, the ignition coil 22 provides the second and subsequent discharging each time with the supply of the primary current I1 for a short period, because the ignition coil 22 can restore a sufficient electric discharge energy in the short period.

Figure 7:
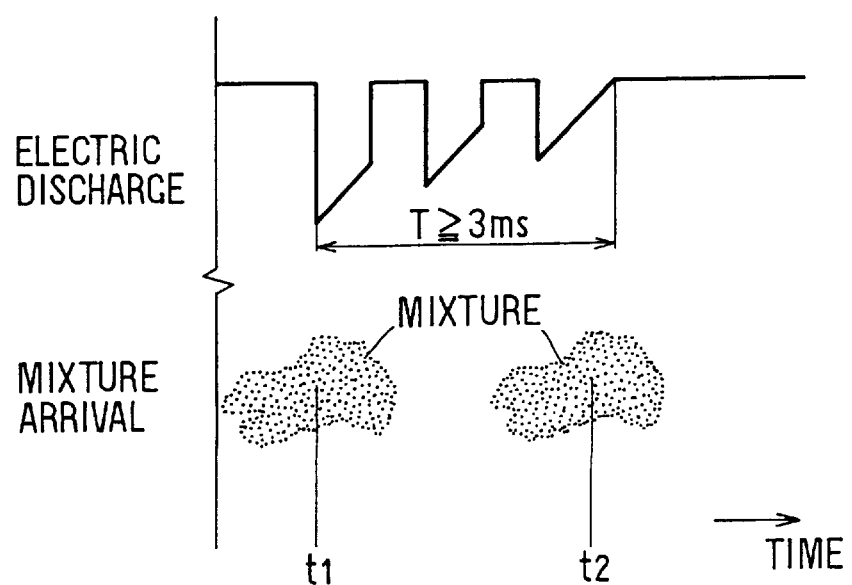
FIG. 7 is a time chart showing a relation between a multiple discharging and fuel-rich mixture arrival.
Figure 8:
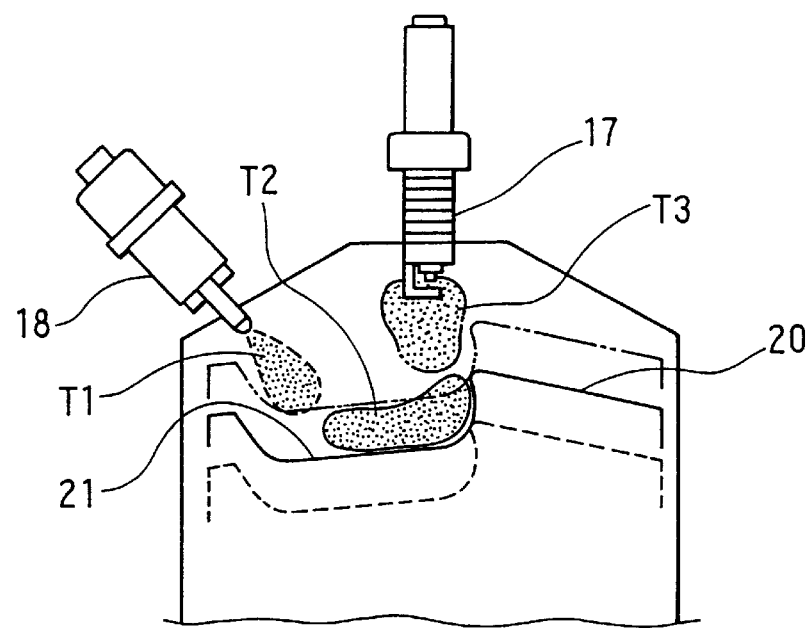
FIG. 8 is a schematic view showing a flow of fuel-rich mixture in a conventional engine system.
Figure 9:
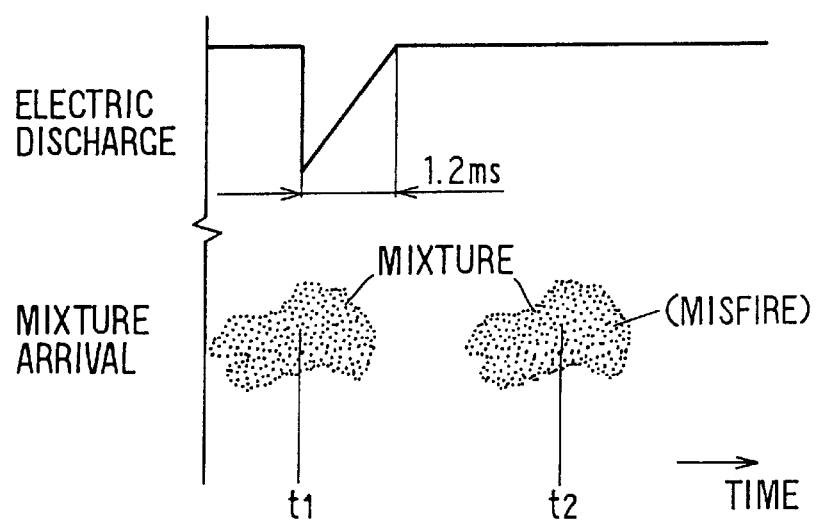
FIG. 9 is a time chart showing a relation between a multiple discharging and fuel-rich mixture arrival in the conventional engine system.

As the multiple discharging lasts for a long discharging period (e.g., more than 3 ms), the fuel-rich mixture in the stratified mixture within the combustion chamber 19 can be ignited without fail even in case it arrives at the spark plug 17 later after the ignition timing as shown in FIG. 7. Further, as the multiple discharging is disabled in the high engine speed region in which the time of arrival of the fuel-rich mixture at the spark plug 17 varies less, the excessive rise in temperature of the ignition coil 22 and the igniter circuit 26 is suppressed and the wear of electrodes of the spark plug 17 is suppressed as well.

Still further, as the multiple discharging is limited to the fixed angular interval of crankshaft rotation, the number of discharges reduces as the engine rotational speed increases. This will not cause misfire in the engine, because the time of arrival of the fuel-rich mixture at the spark plug 17 varies less as the engine speed rises. This is advantageous to reduce wear of the electrodes and suppress excessive heating of the ignition device.

Figure 4:
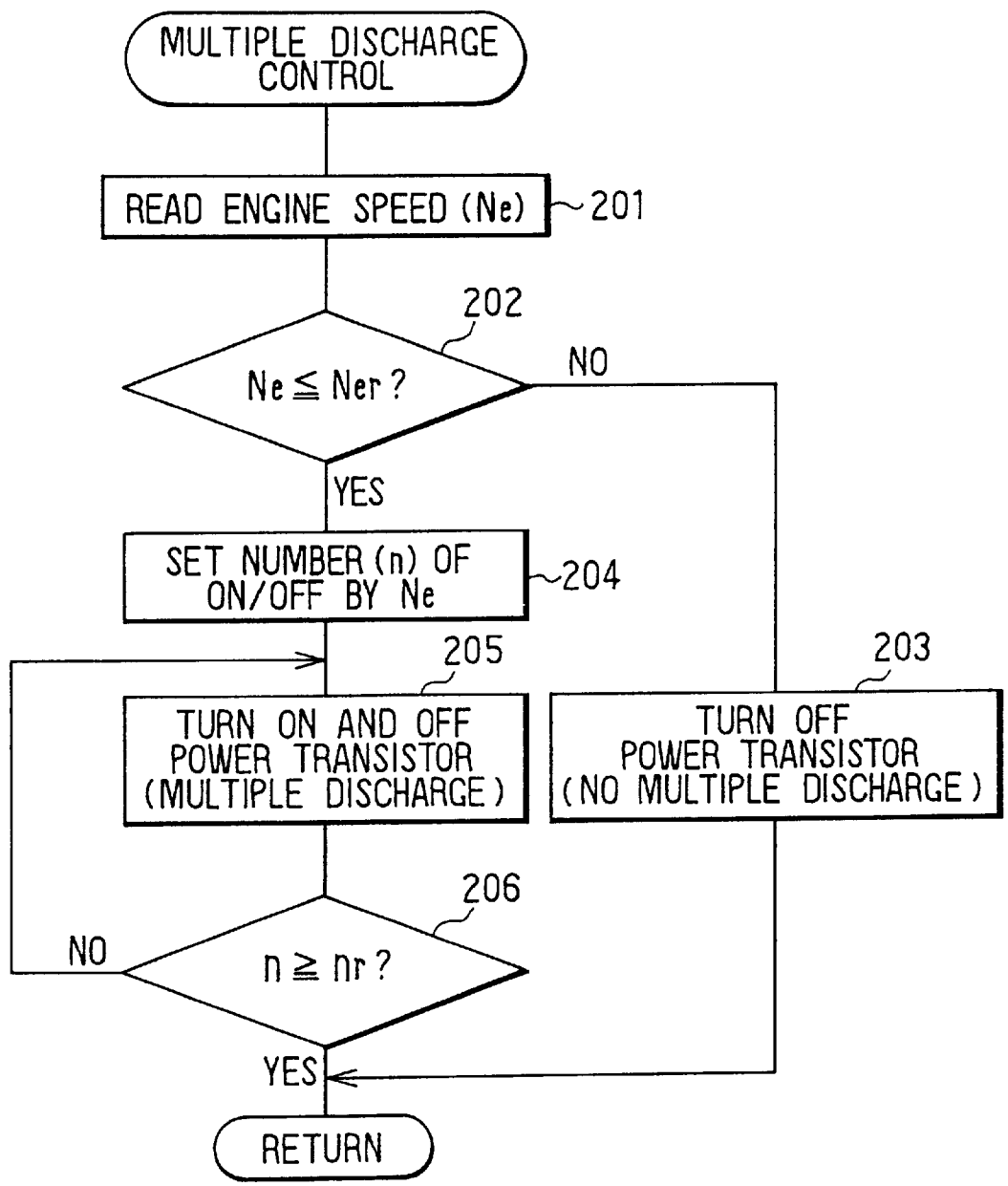
FIG. 4 is a flow chart showing a processing of multiple discharge control in a second embodiment of the present invention.

In a second embodiment, the multiple discharge control is executed as shown in FIG. 4. As long as the engine operating condition is in the high speed region, the microcomputer executes steps 201, 202 (NO) and 203 as in steps 101, 102 and 103 in the first embodiment. That is, the microcomputer disables the multiple discharging of the ignition coil 22 and ignites the stratified mixture in the combustion chamber by a single ignition spark generated at the ignition timing in each ignition cycle.

If the determination at step 204 is YES indicating low or medium engine speed region, the microcomputer sets a reference nr of the number of on/off repetitions of the power transistor 27 for the multiple discharging based on the engine rotational speed Ne. The relation between the engine speed Ne and the reference nr may be stored in the ROM in such a manner that the reference nr decreases as the engine speed Ne rises. The microcomputer then at step 205 turns on and off the power transistor 27 repeatedly at a fixed frequency by the ignition signal IGt shown in FIG. 2 after the first interruption of the primary current I1 of the ignition coil 22 at the ignition timing. Thus, the ignition coil 22 repeats multiple discharging and the spark plug 17 generates multiple sparks. The microcomputer checks at step 206 whether the number of on/off repetitions n of the power transistor 27 has reached the reference nr. If YES, the microcomputer stops producing the ignition signal IGt thereby to stop the multiple discharging of the ignition coil 22.

The above first and second embodiments may be modified so that the multiple discharging may be maintained even under the high engine speed region while reducing the number of multiple discharging than in the low or medium engine speed region. It is also possible to vary the number of multiple discharges based on, in addition to the engine rotational speed, other engine operating parameters such as the intake air pressure Pm, intake air amount, throttle opening angle, fuel injection amount, coolant temperature and intake air temperature which affect ignitability of the stratified mixture.

Figure 5:
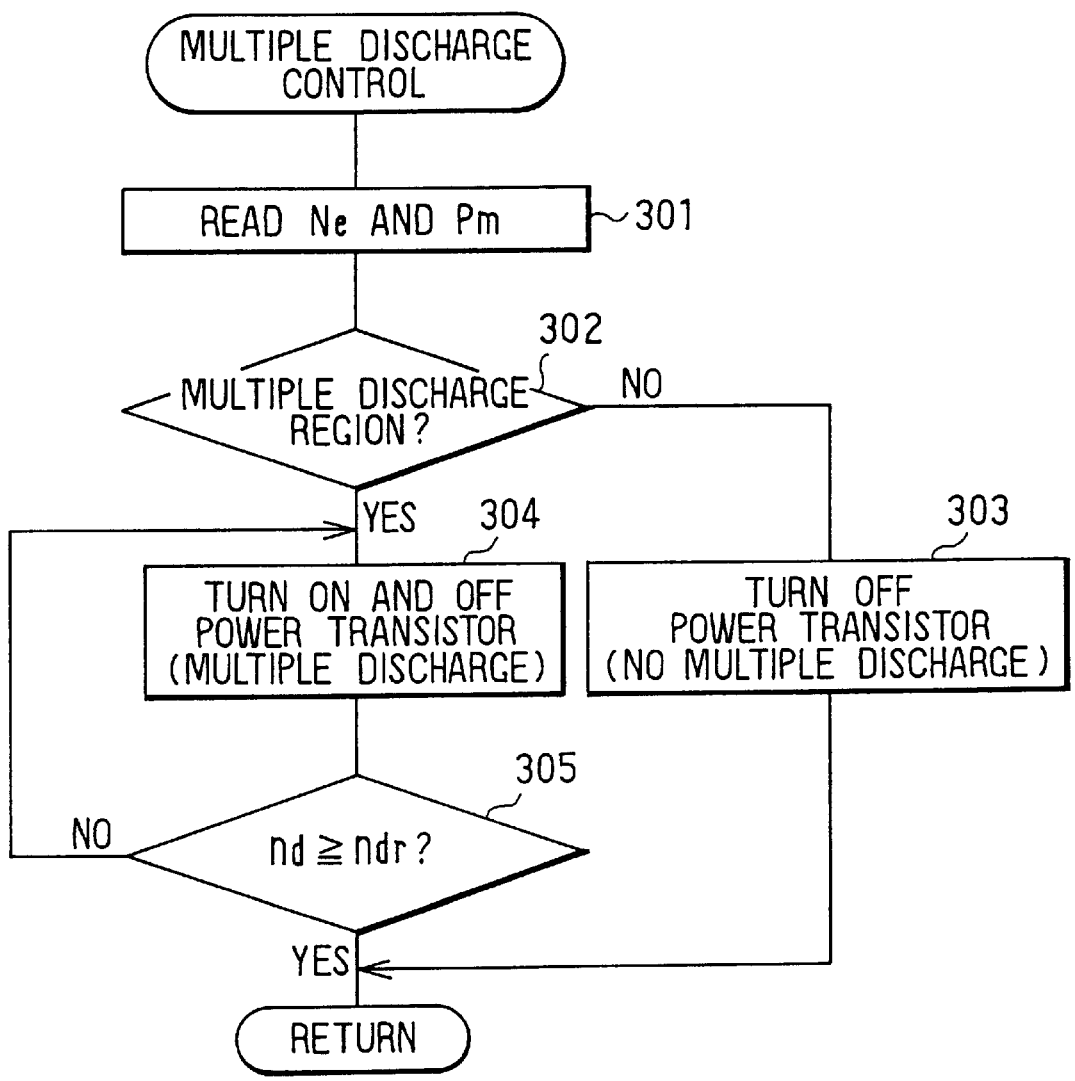
FIG. 5 is a flow chart showing a processing of multiple discharge control in a third embodiment of the present invention.
Figure 6:
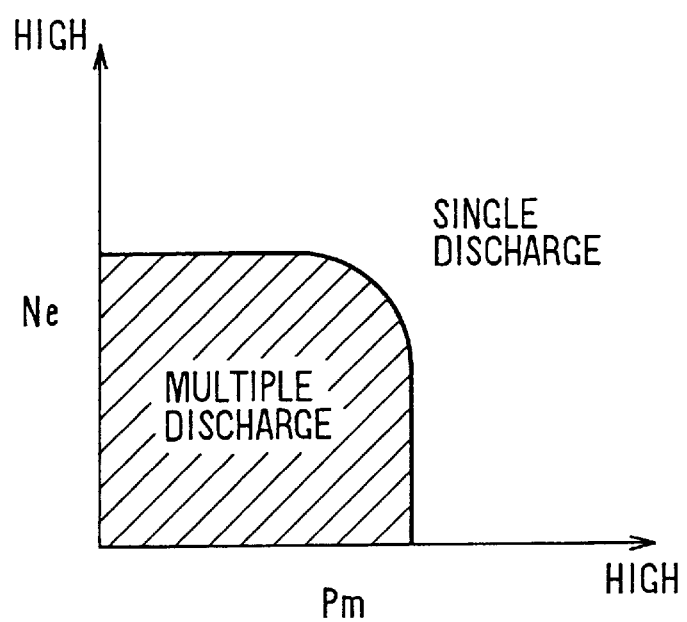
FIG. 6 is a data map showing an engine operating region for a multiple discharging in the third embodiment.

In the third embodiment shown in FIGS. 5 and 6, the multiple discharge control is executed in a predetermined multiple discharges region defined by the engine speed Ne and the engine load (intake air pressure Pm). As shown in FIG. 5, the microcomputer reads at step 301 the engine operating parameters, Ne and Pm, and checks at step 302 whether the engine condition is in the multiple discharges region. This region may be defined by the engine speed Ne and the intake pressure pm as indicated by hatched lines in FIG. 6, so that the multiple discharging may be limited only to the relatively low speed and low load region.

The microcomputer executes the multiple discharging at step 304 in response to the YES determination at step 302, while it disables the multiple discharging at step 303 in response to the NO determination at step 302.

Following step 304, the microcomputer checks at step 305 whether the number of multiple discharges nd has reached a reference ndr. The reference ndr may be set to two or more and preferably be variable with the engine operating parameter such as the engine speed Ne and/or engine load Pm. Even only two sparks will improve the ignitability of the mixture than the single spark.

In the above third embodiment, the multiple discharging region may be defined by only the engine load Pm. The air-fuel mixture is changed from the relatively lean stratified mixture to the relatively rich non-stratified uniform mixture as the engine load increases in the direct injection type engine 11. As a result, the combustion chamber is filled with the relatively rich mixture uniformly and hence the change in the time of arrival of the fuel-rich mixture at the spark plug 17 does not affect so much on the ignitability of the mixture. Therefore, the non-stratified mixture richer in fuel than the stratified mixture can be ignited without fail by the single spark of the spark plug under the engine high load condition.

The present invention should not be limited to the above embodiments and modifications but may be implemented in other ways without departing from the spirit of the invention.

What is claimed is:

1. An ignition control system for a direct fuel injection type engine, said system comprising:
   a spark plug mounted on the engine to ignite a stratified fuel-air mixture having a fuel-rich portion of directly injected fuel;
   an ignition coil connected to generate a high voltage at an ignition time so that the spark plug generates an ignition spark;
   a switching device connected to switch a primary current of the ignition coil on and off; and
   a control unit connected to turn the switching device on and then off at the ignition time,
   wherein the control unit repetitively further turns the switching device on and off after the ignition time before the ignition coil has fully discharged so that the spark plug generates multiple sparks.

2. An ignition control system as in claim 1, wherein the control unit's repetitive operation of the switching device is enabled and disabled based on an operating region of the engine.

3. An ignition control system as in claim 2, wherein the control unit's repetitive operation of the switching device is performed only in a region where engine rotational speed is below a reference speed.

4. An ignition control system as in claim 1, wherein the control unit reduces the number of repetitive operations of the switching device as a rotational speed rises.

5. An ignition control system as in claim 1, wherein the control unit's repetitive operation of the switching device is performed only in a region where engine load is below a reference load.

6. An ignition control system as in claim 1, wherein the control unit's repetitive operation of the switching device is performed only during a fixed angular rotation interval of an engine crankshaft.

7. An ignition control system for a direct fuel injection type engine, said system comprising:
   a spark plug mounted on the engine to ignite a stratified fuel-air mixture having a fuel-rich portion of directly injected fuel;
   an ignition coil connected to generate a high voltage so that the spark plug generates an ignition spark; and
   control unit connected to drive the ignition coil to generate the high voltage at an ignition time,
   wherein the control unit also drives the ignition coil again before the coil has fully discharged after the ignition time to generate a high voltage a multiple of times for each ignition time.

8. An ignition control system as in claim 7, wherein the control unit repetitive drives of the ignition coil in at least one of a high engine speed region and a high engine load region.

9. An ignition control system as in claim 8, wherein the engine has a piston configuration which guides a fuel-rich part of a stratified mixture to the spark plug.

10. An ignition control method for a direct fuel injection type engine having a spark plug mounted to ignite a stratified fuel-air mixture having a fuel-rich portion of directly injected fuel, an ignition coil and a piston configured to guide a fuel-rich part of a stratified mixture to the spark plug, the method comprising:
    driving the ignition coil so that the ignition coil generates a high voltage to be applied to the spark plug at an ignition time; and
    again driving, after the ignition time but within a time period required by the ignition coil otherwise to fully discharge, the ignition coil repeatedly at a fixed frequency to generate a high voltage repeatedly for a predetermined interval following the ignition time.

11. An ignition control method as in claim 10, further comprising:
    checking whether the engine is in a predetermined operating region of at least one of a high engine speed region and a high engine load region; and disabling the again driving step when the checking step determines that the engine is in the predetermined operating region.

12. An ignition control method as in claim 10, further comprising:

reducing the number of repetitive driving cycles of the ignition coil after the ignition time as at least one of engine speed and engine load rises.

13. An ignition control method as in claim 10, wherein the predetermined interval is defined by rotation of an engine crankshaft through a fixed angular interval.

14. An ignition control system for a direct fuel injection type engine having a spark plug mounted to ignite a stratified fuel-air mixture having a fuel-rich portion of directly injected fuel, said system comprising:

an ignition coil having a low voltage primary winding and a high voltage secondary winding;

a current control switch connected to control current flow to said primary winding and operated so that (a) the primary winding current is interrupted at a commanded ignition time and, (b) for at least one predetermined engine operational condition, primary winding current is again switched on and off at least once after the commanded ignition time but before the ignition coil has been fully discharged thereby causing multiple high voltage ignition cycles to occur in association with each commanded ignition time during the existence of said at least one predetermined engine operational condition.

15. An ignition control method for a direct fuel injection type engine having a sparking plug mounted to ignite a stratified fuel-air mixture having a fuel-rich portion of directly injected fuel an ignition coil having a low voltage primary winding and a high voltage secondary winding, said method comprising:

interrupting primary winding current at a commanded ignition time, and for at least one predetermined engine operational condition, turning the primary winding current on and off at least once after the commanded ignition time but before the ignition coil has been fully discharged thereby causing multiple high voltage ignition cycles to occur in association with each commanded ignition time during the existence of said at least one predetermined engine operational condition.

* * * * *